(12) United States Patent
Shibahara et al.

(10) Patent No.: US 7,798,721 B2
(45) Date of Patent: Sep. 21, 2010

(54) FLUID DYNAMIC BEARING DEVICE

(75) Inventors: Katsuo Shibahara, Kuwana (JP); Kenji Ito, Kuwana (JP); Isao Komori, Kuwana (JP); Ryouichi Nakajima, Kuwana (JP); Tetsuya Kurimura, Kuwana (JP)

(73) Assignee: NTN Corporation, Osaka-shi (JP)

( * ) Notice: Subject to any disclaimer, the term of this patent is extended or adjusted under 35 U.S.C. 154(b) by 706 days.

(21) Appl. No.: 10/591,802

(22) PCT Filed: Mar. 17, 2005

(86) PCT No.: PCT/JP2005/004822

§ 371 (c)(1),
(2), (4) Date: May 18, 2007

(87) PCT Pub. No.: WO2005/098251

PCT Pub. Date: Oct. 20, 2005

(65) Prior Publication Data
US 2007/0274617 A1 Nov. 29, 2007

(30) Foreign Application Priority Data
Mar. 30, 2004 (JP) .............................. 2004-100362
May 19, 2004 (JP) .............................. 2004-149632
Jan. 21, 2005 (JP) .............................. 2005-014585

(51) Int. Cl.
*F16C 32/06* (2006.01)
*H02K 5/16* (2006.01)
*B29D 22/00* (2006.01)

(52) U.S. Cl. ...................... 384/107; 384/100; 428/35.7; 310/90

(58) Field of Classification Search ................. 384/100, 384/107, 112, 133, 276, 279; 29/898.02; 310/90, 67 R, 43, 89, 90.5; 524/492–496; 428/35.7
See application file for complete search history.

(56) References Cited

U.S. PATENT DOCUMENTS

| | | | | |
|---|---|---|---|---|
| 5,363,003 | A * | 11/1994 | Harada et al. | 310/67 R |
| 5,750,616 | A * | 5/1998 | Shimpuku et al. | 524/496 |
| 6,284,831 | B1 * | 9/2001 | Shimpuku et al. | 524/494 |
| 6,756,715 | B2 * | 6/2004 | Hirose et al. | 310/90 |
| 6,832,853 | B2 * | 12/2004 | Fujinaka | 384/100 |

(Continued)

FOREIGN PATENT DOCUMENTS

JP           05338097 A   * 12/1993

(Continued)

*Primary Examiner*—Marcus Charles
(74) *Attorney, Agent, or Firm*—Wenderoth, Lind & Ponack, L.L.P.

(57) ABSTRACT

The present invention provides a fluid dynamic bearing device having high durability and capable of being produced at low cost. In the fluid dynamic bearing device, a housing and a disc hub are resin molded parts, and a thrust bearing gap is formed between an upper end surface of the housing and a lower end surface of the disc hub. In this case, the surfaces function as sliding portions temporarily in sliding contact with each other during operation of the bearing. A diameter of PAN-based carbon fibers blended as reinforcement fibers in the resin housing is 12 μm or less, and the blending amount is within a range of 5 to 20 vol %, thereby making it possible to prevent occurrence of flaws and wear in the sliding portions.

21 Claims, 8 Drawing Sheets

U.S. PATENT DOCUMENTS

| | | | |
|---|---|---|---|
| 6,851,859 B2 * | 2/2005 | Takehana et al. | 384/100 |
| 7,023,119 B2 * | 4/2006 | Doemen | 310/90.5 |
| 2002/0061145 A1 | 5/2002 | Kobayashi et al. | |
| 2003/0164653 A1 * | 9/2003 | Yasuda | 310/90 |

FOREIGN PATENT DOCUMENTS

| | | |
|---|---|---|
| JP | 7-332353 | 12/1995 |
| JP | 8-207790 | 8/1996 |
| JP | 11117935 A * | 4/1999 |
| JP | 11-170397 | 6/1999 |
| JP | 2000-291648 | 10/2000 |
| JP | 2001-107972 | 4/2001 |
| JP | 2002-155939 | 5/2002 |
| JP | 2002226713 A * | 8/2002 |
| JP | 2002-266849 | 9/2002 |
| JP | 2003-262217 | 9/2003 |
| JP | 2003-314537 | 11/2003 |
| JP | 2004-28165 | 1/2004 |
| WO | WO 02062899 A1 * | 8/2002 |

* cited by examiner

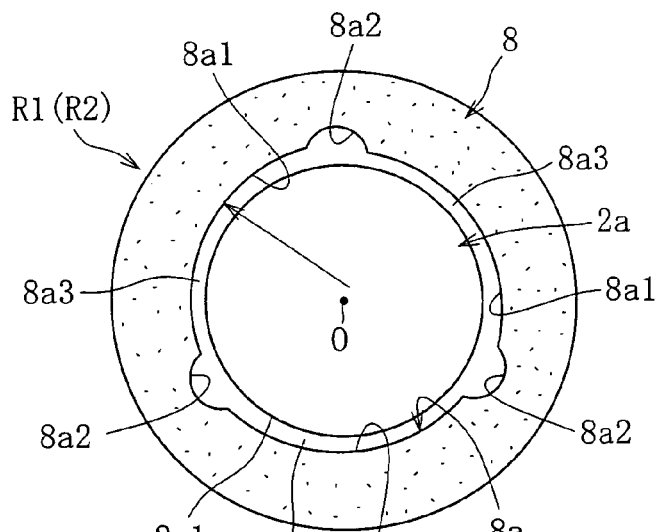
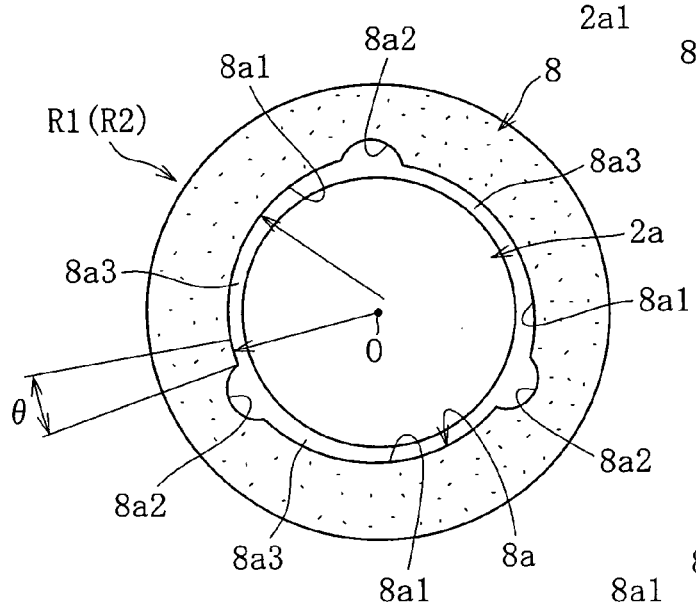
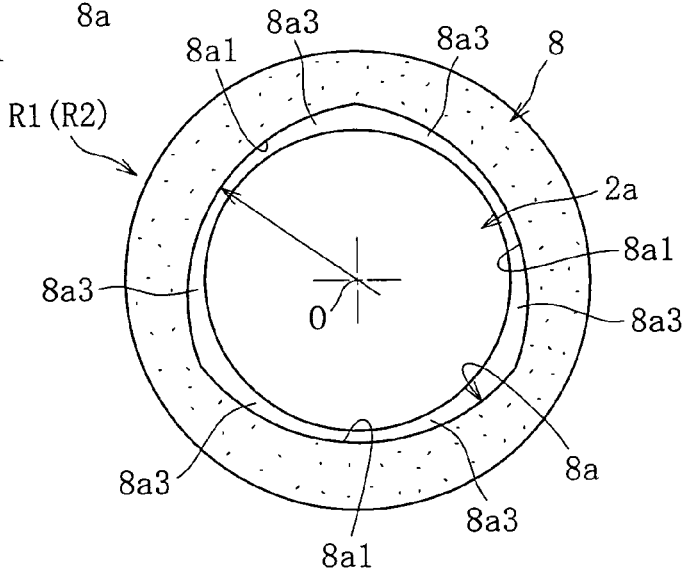

FLUID DYNAMIC BEARING DEVICE

BACKGROUND OF THE INVENTION

1. Field of the Invention

The present invention relates to a fluid dynamic bearing device. This fluid dynamic bearing is suitable as a bearing device for use in a spindle motor for an information apparatus, for example, a magnetic disk apparatus, such as an HDD or an FDD, an optical disk apparatus, such as a CD-ROM, a CD-R/RW, or a DVD-ROM/RAM, or a magneto-optical disk apparatus, such as an MD or an MO, a polygon scanner motor for a laser beam printer (LBP), a color wheel motor for a projector, or a small motor for an electric apparatus, such as an axial flow fan.

2. Description of the Related Art

Apart from high rotational accuracy, an improvement in speed, a reduction in cost, a reduction in noise, etc. are required of the various motors mentioned above. One of the factors determining such requisite performances is a bearing supporting a spindle of the motor. Recently, as a bearing of this type, use of a fluid dynamic bearing superior in the above-mentioned requisite performances is being considered, or such the fluid dynamic bearing has been actually put into practical use.

JP 2000-291648 A discloses, as an example, a fluid dynamic bearing device which is to be used in a spindle motor for a disk drive device, such as an HDD. In the bearing device, a bearing sleeve is fixed to an inner periphery of a housing in a form of a bottomed cylinder, and a shaft member having an outwardly protruding flange portion is inserted into an inner periphery of the bearing sleeve. A fluid dynamic pressure is generated in a radial bearing gap and a thrust bearing gap formed between the rotating shaft member and stationary members (i.e., the bearing sleeve, the housing, etc.), and the shaft member is supported in a non-contact fashion by this fluid dynamic pressure.

The fluid dynamic bearing is composed of components, such as a housing, a bearing sleeve, a shaft member, a thrust member, and a seal member. To secure the high bearing performance required as performance of information apparatuses becomes increasingly high, efforts are being made to achieve an improvement in machining precision and assembly precision for the components. On the other hand, with a tendency of information apparatuses toward a reduction in price, a demand for a reduction in cost of such the fluid dynamic bearing device is becoming increasingly strict.

SUMMARY OF THE INVENTION

It is an object of the present invention to provide a fluid dynamic bearing device which exhibits high durability and which can be manufactured at low cost.

In today's fluid dynamic bearing devices, to meet the above-mentioned requirements, formation of the stationary members on a stationary side of the bearing (e.g., the housing) and the rotating members on a rotary side thereof (e.g., the shaft member and the disk hub) of resins, is being considered. On the other hand, in a fluid dynamic bearing device, due to its structure, temporary sliding contact between the rotating member and the stationary member, opposed to each other through an intermediation of the bearing gap, is inevitable. When such the sliding contact occurs between members formed of resins, there is a fear of reinforcement fibers blended in one resin member flawing or wearing a mating member.

An examination conducted by the present inventors has shown that when a diameter of the reinforcement fibers blended in the resin is too large, a rigidity of the reinforcement fibers increases, with the result that flaws and wear are caused in the mating resin member during sliding, and that too large a blending amount of reinforcement fibers leads to an increase in frequency of contact between the reinforcement fibers and the mating resin member, resulting in a similar problem. It has become clear that, in the former case, this problem occurs when the fiber diameter exceeds 12 µm, and that, in the latter case, this problem occurs when the blending amount exceeds 20 vol %.

According to the present invention, a fluid dynamic bearing device includes: a rotating member; a stationary member; a radial bearing portion for retaining the rotating member and the stationary member in a radial direction in a non-contact fashion by a dynamic pressure action of a fluid generated in a radial bearing gap between the rotating member and the stationary member; and a thrust bearing portion for retaining the rotating member and the stationary member in a thrust direction in the non-contact fashion by a dynamic pressure action of the fluid generated in a thrust bearing gap between the rotating member and the stationary member, in which at least portions of the stationary member and the rotating member facing the thrust bearing gap are all formed of resins, and in which at least one of the resin portions is blended with reinforcement fibers of a fiber diameter of 1 to 12 µm as a filler.

By thus making the diameter of the reinforcement fibers 12 µm or less, the reinforcement fibers are softened, so it is possible to prevent the mating resin member from being flawed through contact with the reinforcement fibers, making it possible to achieve an improvement in terms of the wear resistance of the thrust bearing portion.

Further, by setting the blending amount of the reinforcement fibers in the resin to 5 to 20 vol %, it is possible to reduce the frequency of contact between the reinforcement fibers and the mating resin member, so it is possible to achieve a further improvement in the wear resistance of the thrust bearing portion. A reason for setting the blending amount of the reinforcement fibers to 5 vol % or more is that, if it is less than that, a reinforcement effect is reduced, resulting in a deterioration in wear resistance.

By thus forming the stationary member and the rotating member, opposed to each other through the intermediation of the thrust bearing gap, of resins, values of their respective coefficients of linear expansion in an axial direction are made generally the same, so if there is a change in temperature, it is possible to maintain a fixed thrust bearing gap, making it possible to achieve a further improvement in terms of rotational accuracy. Further, resin molded parts can be manufactured at low cost through injection molding, so it is possible to achieve a reduction in production cost of the bearing device. Further, by forming the rotating member of a resin, a reduction in weight is achieved as compared with a case in which the rotating member is formed of metal, whereby an improvement in shock resistance is achieved.

Apart from the reinforcement fibers, a filler may further include an electrically conductive agent. In general, a resin is an insulating material, so, when the components are formed of resins as described above, the rotating member is charged with static electricity generated through friction between the rotating member and air, and there is a fear of a difference in potential being generated between a magnetic disk and a magnetic head, or peripheral apparatuses being damaged through discharge of the static electricity. In view of this, when an electrically conductive agent is included in the filler of the resin member, it is possible to secure conductivity between the rotary side and the stationary side, thus eliminating such the problem. There are no particular limitations regarding the kind of electrically conductive agent; examples of the electrically conductive agent that can be used include materials in the form or fibers or powder, such as carbon fibers, carbon black, graphite, carbon nanomaterial, and metal powder.

From the viewpoint of oil resistance and moldability, it is desirable that one of the resin portions of the stationary member and the rotating member facing the thrust bearing gap be formed of LCP. From a similar viewpoint, one of the resin portions of the stationary member and the rotating member facing the thrust bearing gap may be formed of PPS.

When a total amount of filler in the resin (inclusive of the electrically conductive agent if there is included some) exceeds 30 vol %, a fusion-bonding strength when another member is bonded to the resin member by ultrasonic fusion-bonding markedly decreases. To prevent this, it is desirable for the total amount of filler in the resin to be 30 vol % or less.

As the reinforcement fibers, it is possible to use PAN-based carbon fibers superior in strength and elastic modulus.

By forming the resin portions of the stationary member and the rotating member facing the thrust bearing gap of resins differing with one another in base resin, it is possible to prevent adhesion of the stationary member and the rotating member during sliding.

To be more specific, examples of the resin portions of the rotating member include a flange portion provided on the shaft member, and a rotating member having a rotor magnet mounting portion.

Here, examples of what is referred to as a rotating member include a disk hub and a turntable provided in a disk device, such as an HDD, and a rotor part for attaching a polygon mirror of an LBP.

According to the present invention, at least a part of the stationary member and the rotating member are formed of resins, whereby it is possible to achieve a reduction in cost, a reduction in impact load through a reduction in weight, and high durability. Further, it is also possible to achieve an improvement in terms of the wear resistance of the thrust bearing portion.

As stated above, in order to achieve a reduction in weight and production cost, etc., formation of the housing of a resin is being considered. One of the issues to be taken into account when forming the housing of a resin is how to secure the requisite fixation force between the resin housing and a metal member retaining the housing, such as the motor bracket. In particular, high shock resistance characteristic is required of a fluid dynamic bearing device for use in a portable information apparatus, so there is a demand for a further improvement in terms of a fixation force.

Adhesion is an example of a method of obtaining a high fixation force. In this case, to enhance the adhesion force between a metal material and a resin material, it would be possible to perform on the resin molded surface a surface treatment, such as alkali etching, plasma etching, or UV treatment. In such the method, however, after the molding of the housing of a resin material, it is necessary to separately perform a surface treatment on an adhesion/fixation surface, resulting in an increase in the number of processing steps, which leads to an increase in production cost.

It is accordingly an object of the present invention to achieve a reduction in the production cost of the housing of a fluid dynamic bearing device of this type, and to achieve an enhancement in the fixation strength between the housing and the other member formed of metal.

To achieve the above-mentioned object, according to the present invention, a fluid dynamic bearing device includes:

a housing; a bearing sleeve fixed in position inside the housing; a rotating member making a relative rotation with respect to the bearing sleeve and the housing; a radial bearing portion for supporting the rotating member in a radial direction in a non-contact fashion by a dynamic pressure action of a lubricant generated in a radial bearing gap between the rotating member and the bearing sleeve; and a thrust bearing portion for supporting the rotating member in a thrust direction in the non-contact fashion by a dynamic pressure action of the lubricant generated in a thrust bearing gap between the rotating member and the housing, in which the housing constitutes the thrust bearing portion and has a thrust bearing surface in which dynamic pressure grooves are formed and a fixation surface to which another metal member is fixed, and the fluid dynamic bearing device is characterized in that the housing has a portion including the thrust bearing surface and formed of a resin material, and a portion including the fixation surface formed of a metal material.

Here, the "other member formed of metal" is not restricted to a component of the fluid dynamic bearing device, but includes all that is fixed to the housing. For example, when the bearing sleeve is formed of a metal material and fixed to the inner peripheral surface of the housing, the bearing sleeve corresponds to the other member formed of metal. Further, the metal motor bracket fixed to the outer peripheral surface of the housing of the fluid dynamic bearing device also corresponds to the other member formed of metal.

In general, when metal members are fixed to each other, a high fixation force can easily be obtained therebetween. Utilizing this fact, in the present invention, a portion including the fixation surface to which the other member formed of metal is fixed is formed of a metal material, whereby it is possible to reliably fix the housing and the other member formed of metal to each other. In particular, when the fixation of the housing to the other member formed of metal is effected through adhesion, it is possible to enhance the adhesion strength between the fixation surface of the housing and the other member formed of metal on the fixation surface. Further, after the portion including the fixation surface of the housing is molded of a resin material, it is possible to omit the step of separately performing the surface treatment on the molded fixation surface, whereby it is possible to achieve a reduction in production cost.

Further, in the present invention, a portion of the housing including the thrust bearing surface is formed of a resin material, so it is possible to mold the dynamic pressure grooves of resin material simultaneously with the portion including the thrust bearing surface. Thus, as compared with the case in which the portion including the thrust bearing surface is formed of a metal material, it is possible to omit the step of separately machining the dynamic grooves. In this way, the step of forming the dynamic pressure grooves is simplified, making it possible to achieve a further reduction in cost.

As stated above, in the fluid dynamic bearing device of the present invention, the housing has a hybrid structure composed of a metal portion and a resin portion as described above, so it is possible to secure a sufficient adhesion force for the adhesion between the housing and the other member formed of metal while achieving a reduction in the weight and production cost of the housing.

The housing of the construction described above can easily be manufactured through injection molding with a resin material of the portion including the fixation surface formed of a metal material as an insert part.

The housing may have, for example, a cylindrical side portion, an opening situated at one end of the side portion, and a bottom portion situated at the other end of the side portion, with the thrust bearing surface being provided on a side of the opening.

Alternatively, the housing may also have a cylindrical side portion, an opening situated at one end of the side portion, and a bottom portion situated at the other end of the side portion, with the thrust bearing surface being provided on a side of the bottom portion.

As described above, according to the present invention, it is possible to attain a high fixation strength between the housing and the other member formed of metal to provide a high impact resistance property that allows use, for example, in a portable information apparatus while achieving a reduction in the weight and production cost of the housing of a fluid dynamic bearing device of this type.

A motor having a fluid dynamic bearing device as described above, a rotor magnet, and a stator coil is superior in wear resistance and provides a property superior in durability and rotational accuracy.

BRIEF DESCRIPTION OF THE DRAWINGS

FIGS. 8A through 8C are sectional views of radial bearing portions according to other embodiments;

DESCRIPTION OF THE PREFERRED EMBODIMENTS

In the following, embodiments of the present invention will be described with reference to FIGS. 1 through 13.

Figure 1:
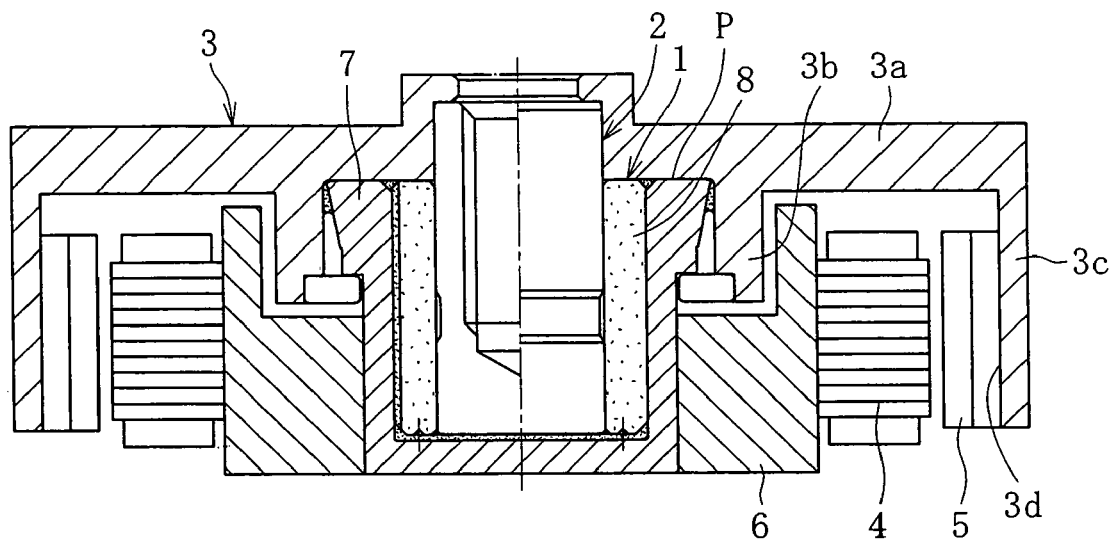
FIG. 1 is a sectional view of an information apparatus spindle motor with a fluid dynamic bearing device according to the present invention incorporated therein.

FIG. 1 shows a construction example of an information apparatus spindle motor in which a fluid dynamic bearing device 1 according to an embodiment of the present invention is incorporated. The spindle motor is used in a disk drive device, such as an HDD, and is equipped with a fluid dynamic bearing device 1 rotatably supporting a shaft member 2 in a non-contact fashion, a disk hub 3 attached to the shaft member 2, and a stator coil 4 and a rotor magnet 5 opposed to each other through the intermediation of, for example, a radial gap. The disk hub 3, for retaining one or a plurality of disks, such as magnetic disks, has the rotor magnet 5 attached to the inner periphery thereof. The stator coil 4 is mounted to the outer periphery of a bracket 6 fixed to the outer periphery of a housing 7 of the fluid dynamic bearing device 1. When the stator coil 4 is energized, the rotor magnet 5 is rotated by electromagnetic force between the stator coil 4 and the rotor magnet 5, whereby the disk hub 3 and the shaft member 2 are rotated integrally as one member (rotating member).

Figure 2:
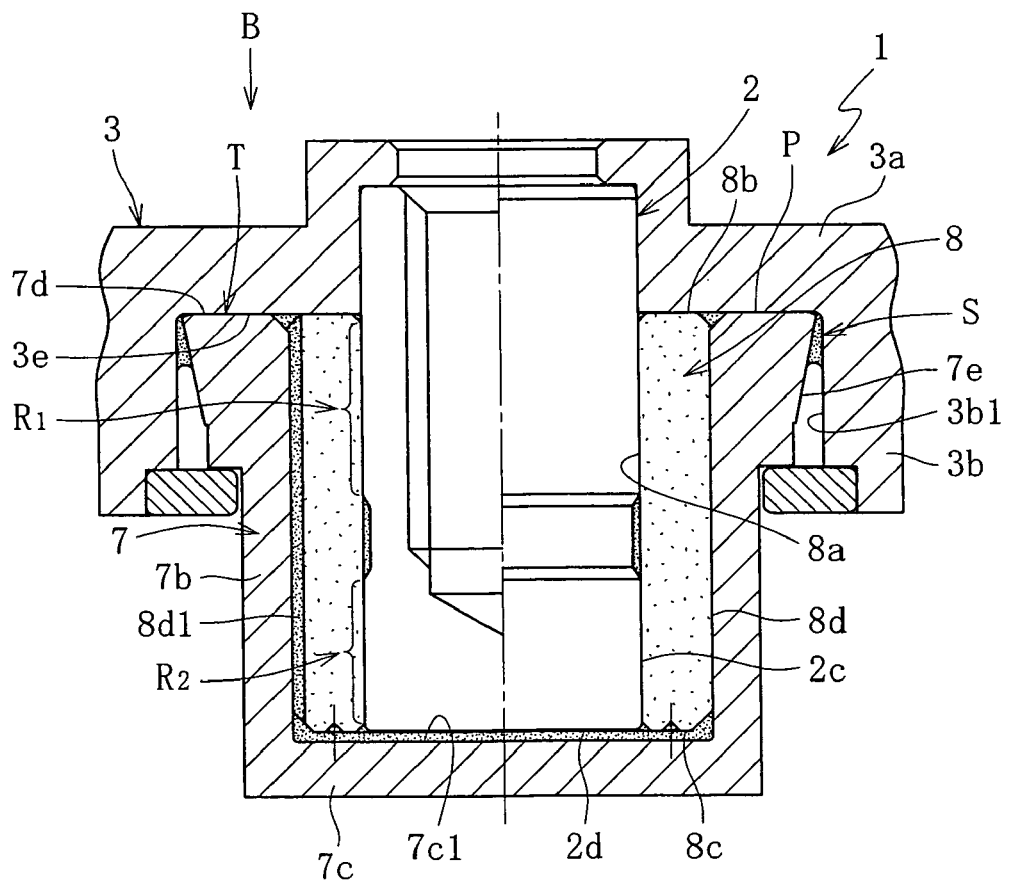
FIG. 2 is a sectional view of the fluid dynamic bearing device.
Figure 3:
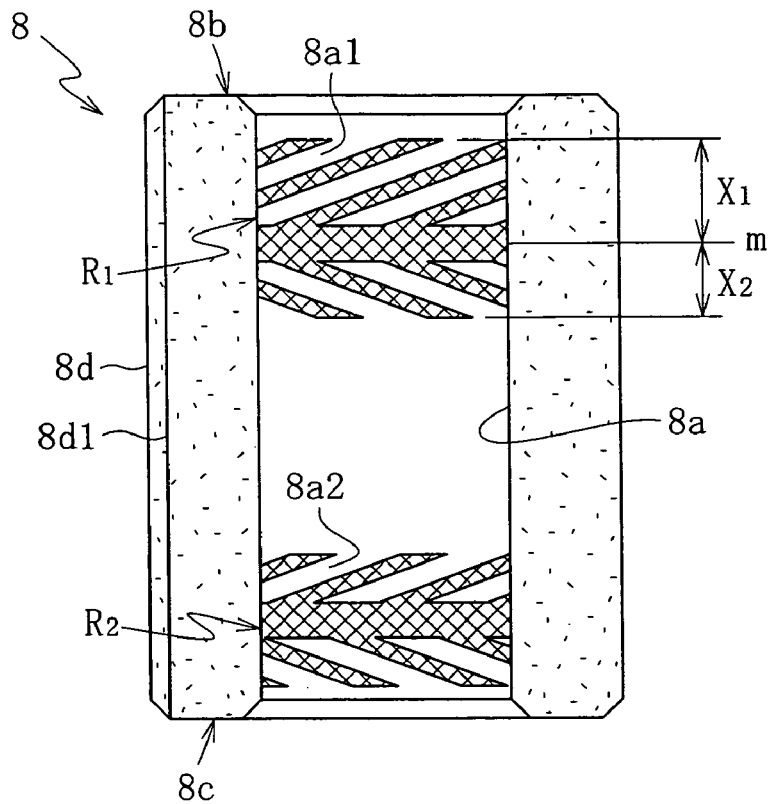
FIG. 3 is a sectional view of a bearing sleeve to be used in the fluid dynamic bearing device.

The disk hub 3 is a cup-shaped resin molded part. FIGS. 1 and 2 show an example of the disk hub 3 having a flange-like base portion $3a$, a first cylindrical protrusion $3b$ formed on the inner diameter side of the base portion $3a$, and a second cylindrical portion $3c$ formed on the outer diameter side of the base portion $3a$. As shown in FIG. 1, in the inner periphery of the second protrusion $3c$ opposed to the motor stator 4, there is provided a mounting portion $3d$ for mounting the rotor magnet 5. The rotor magnet 5 is mounted to the mounting portion $3d$ by adhesion or the like.

FIG. 2 is an enlarged view of the fluid dynamic bearing device 1. The fluid dynamic bearing device 1 is composed of the housing 7, a bearing sleeve 8 fixed to the inner periphery of the housing 7, and the shaft member 2 inserted into the inner periphery of the bearing sleeve 8.

Between an inner peripheral surface $8a$ of the bearing sleeve 8 and an outer peripheral surface $2c$ of the shaft member 2, there are provided a first radial bearing portion R1 and a second radial bearing portion R2 that are axially spaced apart from each other. Further, a thrust bearing portion T is formed between an opening side end surface (upper end surface) $7d$ of the housing 7 and a lower end surface $3e$ of the disk hub 3 fixed to the shaft member 2 (lower end surface on the inner diameter side of the first protrusions $3b$ of the base portion $3a$). In the following description, for the sake of convenience, a bottom portion $7c$ side of the housing 7 will be referred to as a lower side, and the side axially opposite to the bottom portion $7c$ will be referred to as an upper side.

The shaft member 2 is formed as a shaft of a fixed diameter of a metal material such as stainless steel.

The housing 7 of the present invention is a resin molded part in the form of a bottomed cylinder. The housing of the example shown in figures is equipped with a cylindrical side portion $7b$, and the bottom portion $7c$ provided at the lower end of a side portion $7b$, with the bottom portion $7c$ being molded integrally with the side portion $7b$.

In this way, the housing 7 and the disk hub 3 are formed as resin molded parts. Examples of the material to be used for these components include thermoplastic resins, such as amorphous resins, such as polysulfone (PSF), polyether sulfone (PES), polyphenyl sulfone (PPSU), and polyether imide (PEI), and crystalline resins, such as liquid crystal polymer (LCP), polyetherether ketone (PEEK), polybutylene terephthalate (PBT), and polyphenylene sulfide (PPS), and the like. Above all, LCP and PPS, which are superior in oil resistance and dimensional stability, are particularly suitable for the material of the housing 7.

In this connection, by using different base resins for the housing 7 and the disk hub 3, it is possible to prevent adhesion between the housing 7 and the disk hub 3 during sliding. For example, it is possible to use LCP as the base resin of the housing 7, and PPS as the base resin of the disk hub 3.

A filler consisting of reinforcement fibers, a conductive agent, etc. is blended into these base resins, and, by using the resin compositions thus obtained, the housing 7 and the disk 3 are formed separately through injection molding. Examples of the filler to be selected and used as needed include a fibrous filler, such as glass fibers and carbon fibers, a whisker-like filler, such as potassium titanate, a scaly filler, such as mica, and fibrous or powdered conductive fillers, such as carbon black, graphite, carbon nanomaterial, and metal powder. By way of example, in this embodiment, PAN-based carbon fibers, which are superior in strength, elastic modulus, etc., are used as the reinforcement fibers, and carbon nanotube, which helps to secure high conductivity in a small blending amount, is used as the electrical conductive agent.

The disk hub 3 is fixed to the shaft member 2 by an appropriate method. In this connection, by forming the disk hub 3 of the above-mentioned resin composition through injection molding, using the shaft member 2 as an insert part (insert molding), it is possible to perform the molding of the disk hub 3 and the assembly of the shaft member 2 to the disk hub 3 in a single step, making it possible to integrate the shaft member 3 and the disk hub 3 at low cost and with high precision. A rotating member is formed by the shaft member 2 and the disk hub 3 thus integrated with each other.

Figure 4:
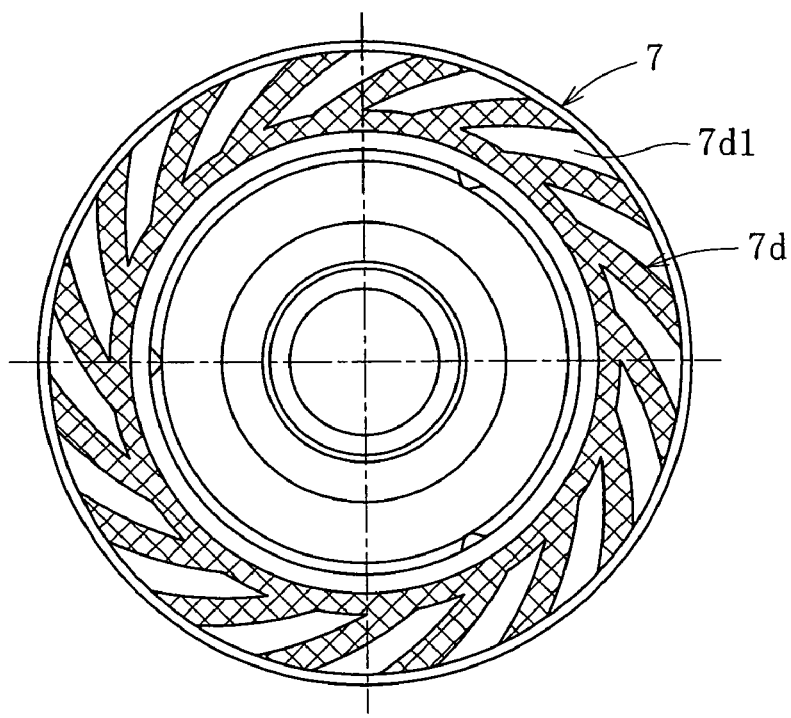
FIG. 4 is a plan view of a housing as seen in the direction of the arrow B of FIG. 2.

As shown in FIG. 4, in the upper end surface 7d constituting the thrust bearing surface of the thrust bearing portion T, there are formed dynamic pressure grooves 7d1 of, for example, a spiral configuration. The dynamic pressure grooves 7d1 are formed at the time of the injection molding of the housing 7. That is, at a prescribed position of the mold for molding the housing 7 (the position where the upper end surface 7d is to be molded), groove matrixes for molding the dynamic pressure grooves 7d1 are previously machined, and the configuration of the groove matrixes is transferred to the upper end surface 7d of the housing 7 at the time of injection molding of the housing 7, whereby it is possible to form the dynamic pressure grooves 7d1 simultaneously with the molding of the housing 7. By the same method, dynamic pressure grooves may be formed in the lower end surface 3e of the disk hub 3 instead of the upper end surface 7d of the housing 7.

Further, the housing 7 has, in the outer periphery of the upper portion thereof, a tapered outer wall 7e whose diameter gradually increases upwardly. Between the tapered outer wall 7e and the inner wall 3b1 of the cylindrical protrusion 3b provided on the disk hub 3, there is formed a tapered seal space S which is gradually diminished upwardly. During rotation of the shaft member 2 and the disk hub 3, the seal space S communicates with the outer diameter side of the thrust bearing gap of the thrust bearing portion T.

The shaft member 2 is formed as a shaft of a fixed diameter of a metal material such as stainless steel.

The bearing sleeve 8 is formed as a cylinder of a porous material consisting, for example, of a sintered metal, in particular, a porous material consisting of a sintered metal whose main component is copper. The bearing sleeve 8 is fixed to a predetermined position of the inner peripheral surface of the housing 7 by, for example, ultrasonic fusion-bonding, whereby a stationary member is formed by the housing 7 and the bearing sleeve 8. It is also possible for the bearing sleeve 8 to be formed of a metal material, such as a soft metal like copper.

On the inner peripheral surface 8a of the bearing sleeve 8 formed of a sintered metal, there are provided axially separated upper and lower two regions constituting the respective radial bearing surfaces of the first radial bearing portion R1 and the second radial bearing portion R2. In these two regions, there are respectively formed dynamic pressure grooves 8a1 and 8a2 of a herringbone configuration (or a spiral configuration) as shown, for example, in FIG. 3. The upper dynamic pressure grooves 8a1 are formed axially asymmetrically with respect to an axial center m (axial center of the region between the upper and lower inclined groves), and an axial dimension X1 of the region on the upper side of the axial center m is larger than an axial dimension X2 of the region on the lower side of the axial center m. Further, in the outer peripheral surface 8d of the bearing sleeve 8, there is formed one or a plurality of axial groove 8d1 extending over the entire axial length of the bearing sleeve.

The shaft member 2 is inserted into the bore defined by the inner peripheral surface 8a of the bearing sleeve 8. When the shaft-member 2 and the disk hub 3 are at rest, slight gaps exist between a lower end surface 2d of the shaft member 2 and an inner bottom surface 7c1 of the housing 7, and between a lower end surface 8c of the bearing sleeve 8 and the inner bottom surface 7c1 of the housing 7.

The inner space, etc. of the housing 7 are filled with a lubricant. That is, the lubricant fills the inner voids of the bearing sleeve 8, the gap portion between the inner peripheral surface 8a of the bearing sleeve 8 and the outer peripheral surface 2c of the shaft member 2, the gap portion between the lower end surface 8c of the bearing sleeve 8 and the lower end surface 2d of the shaft member 2 and the inner bottom surface 7c1 of the housing 7, an axial groove 8d1 of the bearing sleeve 8, the gap portion between the upper end surface 8b of the bearing sleeve 8 and the lower end surface 3e of the disk hub 3, the thrust bearing portion T, and the seal space S.

During rotation of the rotating member consisting of the shaft member 2 and the disk hub 3, the regions (the upper and lower two regions) constituting radial bearing surfaces of the inner peripheral surface 8a of the bearing sleeve 8 are opposed to the outer peripheral surface 2c of the shaft member 2 through the intermediation of the radial bearing gap. Further, the region of the upper end surface 7d of the housing 7 constituting the thrust bearing surface is opposed to the lower end surface 3e of the disk hub 3 through the intermediation of the thrust bearing gap. As the shaft member 2 and the disk hub 3 rotate, dynamic pressure of the lubricant is generated in the radial bearing gap, and the shaft member 2 is supported in a non-contact fashion radially and rotatably by a film of the lubricant formed in the radial bearing gap. As a result, there are formed the first radial bearing portion R1 and the second radial bearing portion R2 supporting the shaft member 2 and the disk hub 3 radially and rotatably in a non-contact fashion. At the same time, dynamic pressure of the lubricant is generated in the thrust bearing gap, and the disk hub 3 is supported rotatably in the thrust direction in a non-contact fashion by the film of the lubricant formed in the thrust bearing gap. As a result, there is formed the thrust bearing portion T supporting the shaft member 2 and the disk hub 3 rotatably in the thrust direction in a non-contact fashion.

As stated above, the dynamic pressure grooves 8a1 of the first radial bearing portion R1 is formed axially asymmetrically with respect to the axial center m, with the axial dimension of the region X1 on the upper side of the axial center being larger than the axial dimension X2 of the region lower than the axial center. Thus, during rotation of the shaft member 2 and the disk hub 3, a lubricant drawing force (pumping force) of the dynamic pressure grooves 8a1 is larger on the upper region than on the lower region. Due to the differential pressure in drawing force, the lubricant filling the gap between the inner peripheral surface 8a of the bearing sleeve 8 and the outer peripheral surface 2c of the shaft member 2 flows downwardly and circulates through the following route: the gap between the lower end surface 8c of the bearing sleeve 8 and the inner bottom surface 7c1 of the housing 7, the axial groove 8d1, and the gap between the lower end surface 3e of the disk hub 3 and the upper end surface 8b of the bearing sleeve 8, before being drawn into the radial bearing gap of the first radial bearing portion R1 again. In this way, the lubricant flows and circulates through the gap portions, whereby it is possible to prevent a phenomenon in which the lubricant pressure in the inner space of the housing 7 and in the thrust bearing gap of the thrust bearing portion T locally becomes negative pressure, thereby making it possible to eliminate problems, such as generation of bubbles due to the generation of negative pressure, leakage of lubricant attributable to the generation of bubbles, and generation of vibration.

The leakage of the lubricant to the exterior can be prevented more effectively by the capillary force of the seal space S and the lubricant drawing force (pumping force) of the dynamic pressure grooves 7*d*1 of the thrust bearing portion T.

In the present invention, both the housing 7 and the disk hub 3 opposed to each other through the intermediation of the thrust bearing gap are formed of resin, so their respective coefficients of linear expansion are substantially the same. Thus, it is possible to make the expansion amount in the axial direction due to a temperature change approximately the same on the stationary side and the rotary side, whereby fluctuation in the width of the thrust bearing gap due to a temperature change is restrained, making it possible to obtain a stable bearing performance.

In the construction described above, the upper end surface 7*d* of the housing 7 and the lower end surface 3*e* of the disk hub 3 that are opposed to each other through the intermediation of the thrust bearing gap temporarily come into sliding contact with each other when the motor starts or is at rest, or due to whirling of the shaft member 2, etc. A problem caused by the sliding contact of the two members is the sliding of resin members on each other at the sliding portion P.

An examination conducted by the present inventors has made it clear that when the average fiber diameter of the carbon fibers blended as reinforcement fibers exceeds 12 μm, the wear amount at the sliding portion P between the disk hub 3 and the housing 7 is markedly increased. It is assumed that this is due to the fact that the carbon fibers that have become rigid due to the increase in fiber diameter damage the soft resin material of the mating member at the sliding portion P, and that wear progresses due to the sliding of the thus roughened resin surface on the resin material of the mating member. On the other hand, when the average fiber diameter of the carbon fibers is less than 1 μm, the reinforcing effect expected of the carbon fibers becomes rather insufficient, which is not appropriate. Thus, it is desirable for the average fiber diameter of the carbon fibers as the filler to be set to the range of 1 to 12 μm (more preferably 5 to 10 μm).

When the reinforcement fibers are too long, the recycling property thereof suffers because the fibers are cut short when surplus resin material is re-used. Further, the transfer property when molding the dynamic pressure grooves is also impaired. From this viewpoint, it is desirable for the average fiber length of the reinforcement fibers to be 500 μm or less (more preferably, 300 μm or less).

Further, an examination conducted by the present inventors has also made it clear that, also when the blending ratio of the carbon fibers exceeds 20 vol %, the wear amount due to the sliding of the resin members on each other at the sliding portion P is markedly increased. It is assumed that this is due to the fact that as a result of the increase in the blending amount of the carbon fibers, the frequency of contact of the carbon fibers with the mating resin member is increased. On the other hand, when the blending ratio of the carbon fibers is less than 5%, it is rather difficult to attain the requisite mechanical strength, and it is difficult to secure the wear resistance of the resin members. Thus, it is desirable for the blending amount of the carbon fibers to be in the range of 5 to 20 vol %.

On the other hand, even if the fiber diameter and the blending ratio of the reinforcement fibers are in the above-mentioned ranges, if the blending amount of other fillers, such as the electrical conductive agent, is too large, the fusion-bonding strength when fixing the housing 7 to another member (e.g., the bearing sleeve 8) by ultrasonic fusion-bonding decreases. An examination conducted by the present inventors has shown that when the total amount of the fillers inclusive of the reinforcement fibers and the electrical conductive agent (the total amount of metal fillers or inorganic fillers) exceeds 30 vol %, the reduction in the strength of the fusion-bonded portion becomes rather conspicuous, thereby leading to a problem in terms of strength. Thus, it is desirable for the total filler amount to be 30 vol % or less.

While in the bearing device 1 described above, there exists, between the housing 7 and the disk hub 3, the sliding portion P between the rotary side and the stationary side, the scope of application of the present invention is not restricted thereto. The present invention is also applicable to a fluid dynamic bearing device of another construction in which the housing 7 and a rotating member are opposed to each other through the intermediation of a thrust bearing gap and in which the opposing portions constitute the sliding portion between resin members. For example, in the fluid dynamic bearing device shown in FIG. 5, the shaft member 2 as the rotating member is composed of a shaft portion 2*a* and a flange portion 2*b*, and thrust bearing gaps are formed between the upper end surface 2*b*1 of the flange portion 2*b* and the lower end surface 8*c* of the bearing sleeve 8, and between the lower end surface 2*b*2 of the flange portion 2*b* and the inner bottom surface 7*c*1 of the housing bottom portion 7*c*, whereby there are formed thrust bearing portions T1 and T2 for supporting the shaft member 2 in the thrust direction in a non-contact fashion by the dynamic pressure action of the lubricant generated in the thrust gaps.

Figure 6:
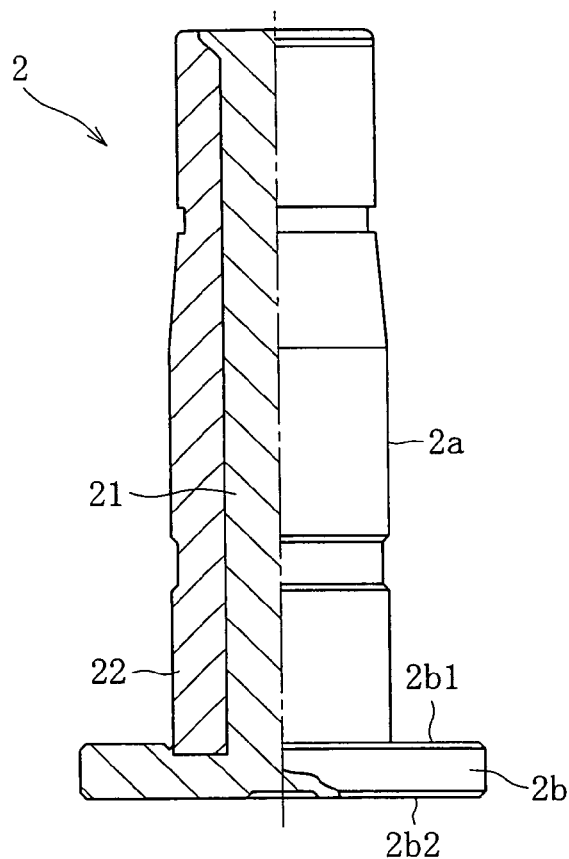
FIG. 6 is a sectional view of a shaft member used in the fluid dynamic bearing device of FIG. 5.

As shown in FIG. 6, in the shaft member 2 of the fluid dynamic bearing device, the outer periphery of the shaft portion 2*a* is formed of a cylindrical metal member 22, and the entire flange portion 2*b* and the core portion of the shaft portion 2*b* are formed of a resin material 21. In this case, the inner bottom surface 7*c*1 of the resin housing 7 and the lower end surface 2*b*2 of the flange portion 2*b* constitute the sliding portion P between resin members, so, by adopting the same construction as that shown in FIGS. 1 through 4, it is possible to obtain the same effect.

In the fluid dynamic bearing device of this type, not only the bearing sleeve 8, but also resin components, such as a seal member 10 for sealing the radial bearing gap and the housing bottom portion 7*c* (thrust plate) which is separate from the side portion 7*b* of the housing 7, can be fixed to the side portion 7*b* of the housing 7 by ultrasonic fusion-bonding.

Figure 7:
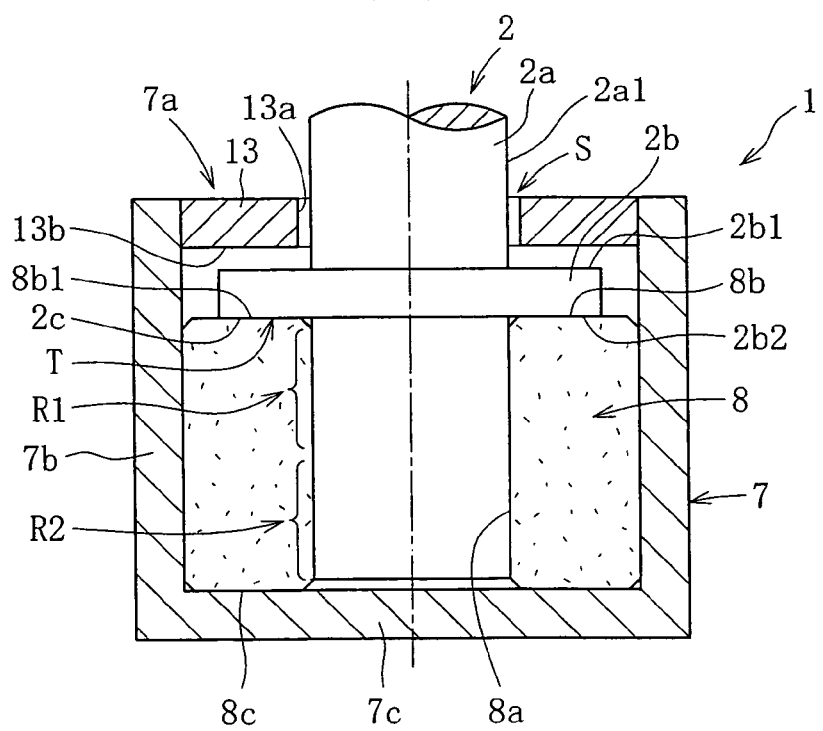
FIG. 7 is a sectional view of a fluid dynamic bearing device according to another embodiment.

In the fluid dynamic bearing device shown in FIG. 7, the thrust bearing portion T is arranged on the opening 7*a* side of the housing 7, and the shaft member 2 is supported in a non-contact fashion in one thrust direction with respect to the bearing member 8. The flange portion 2*b* is provided above the lower end of the shaft member 2, and the thrust bearing gap of the thrust bearing portion T is formed between the lower end surface 2*b*2 of the flange portion 2*b* and the upper end surface 8*b* of the bearing member 8. A seal member 13 is attached to the inner periphery of the opening of the housing 7, and the seal space S is formed between the inner peripheral surface 13*a* of the seal member 13 and the outer peripheral surface of the shaft portion 2*a* of the shaft member 2. The lower end surface 13b of the seal member 13 is opposed to the upper end surface 2b1 of the flange portion 2b through the intermediation of an axial gap, and when the shaft member 2 is upwardly displaced, the upper end surface 2b1 of the flange portion 2b is engaged with the lower end surface 13b of the seal member 13, thereby preventing detachment of the shaft member 2.

In this case, when the flange portion 2b is formed of resin, and the bearing sleeve 8 itself is formed of resin, or the upper end surface 8b of the bearing sleeve 8 is coated with resin, the lower end surface 2b of the flange portion 2b and the upper end surface 8b of the bearing sleeve 8 constitute the resin portions sliding on each other, so, by adopting the same construction as that shown in FIGS. 1 through 4, it is possible to obtain the same effect.

Figure 5:
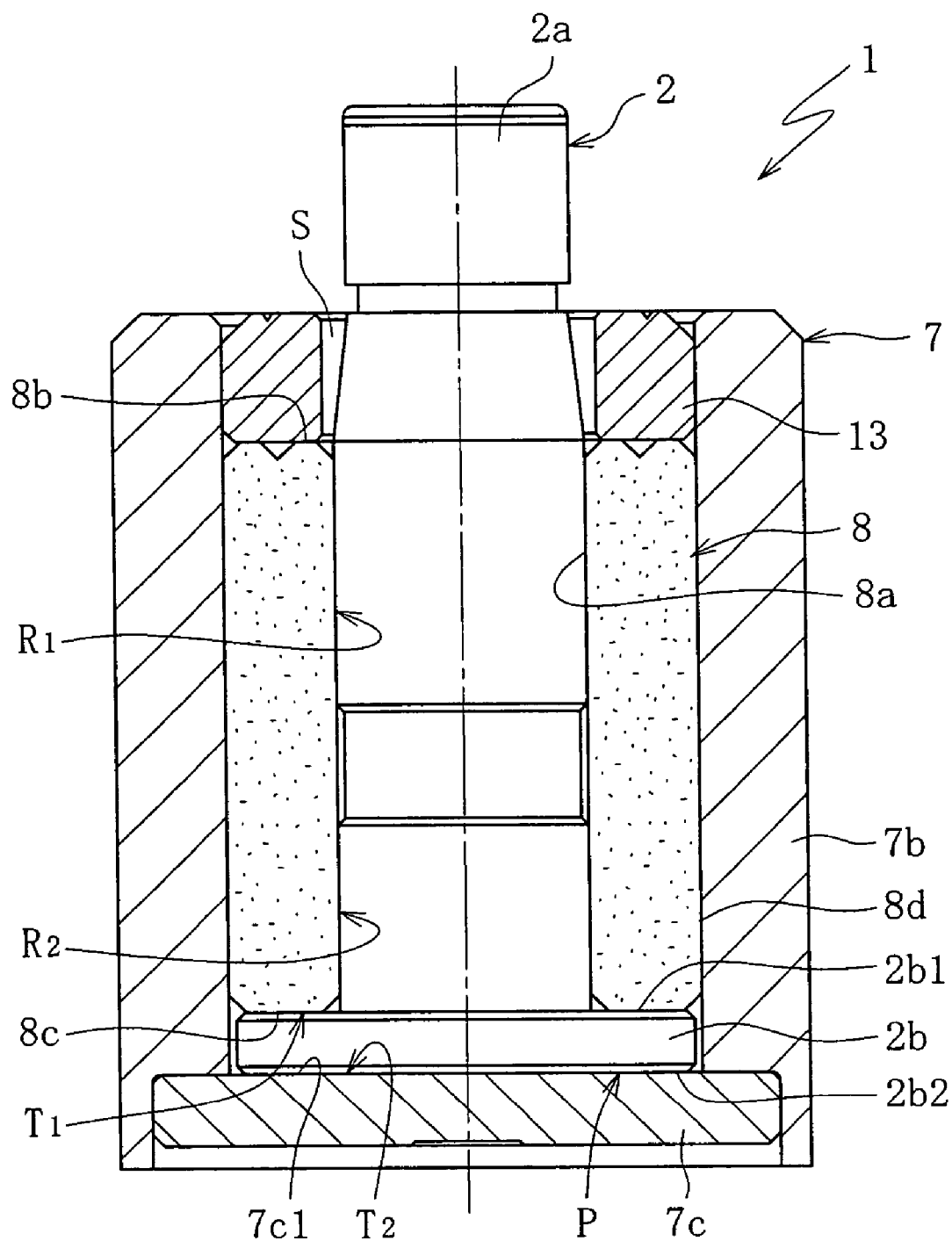
FIG. 5 is a sectional view of a fluid dynamic bearing device according to another embodiment.

It is also possible for the radial bearing portions R1 and R2 to be composed of multi-arc bearings. FIG. 8A shows an example of such the construction, in which the radial bearing portions R1 and R2 of the fluid dynamic bearing device 1 shown in FIG. 5 are formed by multi-arc bearings (also referred to as "tapered bearings"). In this case, a plurality of arcuate surfaces 8a1 are formed in the regions of the inner peripheral surface 8a of the bearing sleeve 8 constituting the radial bearing surfaces of the first radial bearing portion R1 and the second radial bearing portion R2. The arcuate surfaces 8a1 are eccentric arcuate surfaces whose centers are offset from the rotation center O by the same distance and which are formed at equal circumferential intervals. Axial division grooves 8a2 are formed between the eccentric arcuate surfaces 8a1.

By inserting the shaft portion 2a of the shaft member 2 into the bore defined by the inner peripheral surface 8a of the bearing sleeve 8, the respective radial bearing gaps of the first and second radial bearing portions R1 and R2 are formed between the eccentric arcuate surfaces 8a1 of the bearing sleeve 8 and the cylindrical outer peripheral surface 2a of the shaft portion 2a, and between the division grooves 8a2 of the bearing sleeve 8 and the cylindrical outer peripheral surface 2a of the shaft portion 2a. The regions of the radial bearing gaps facing the eccentric arcuate surfaces 8a1 are wedge-shaped gaps 8a3 whose width is gradually diminished in one circumferential direction. The diminishing direction of the wedge-shaped gaps 8a3 coincides with the rotating direction of the shaft member 2.

FIGS. 8B and 8C show other embodiments of multi-arc bearings constituting the first and second radial bearing portions R1 and R2.

In the embodiment shown in FIG. 8B, with the construction shown in FIG. 8A, predetermined regions θ on the minimum gap side of the eccentric arcuate surfaces 8a1 are formed by concentric arcs whose center is the rotation center O. Thus, in the predetermined regions θ, the radial bearing gaps (minimum gaps) are fixed. A multi-arc bearing of such the construction is sometimes called a taper/flat bearing.

In FIG. 8C, the region of the inner peripheral surface 8a of the bearing sleeve 8 is formed by three arcuate surfaces 8a1, and the centers of the three arcuate surfaces 8a1 are offset from the rotation center O by the same distance. In the regions defined by the three eccentric arcuate surfaces 8a1, the radial bearing gaps are gradually diminished in both circumferential directions.

While in all of the above-described multi-arc bearings of the first and second radial bearing portions R1 and R2 are three-arc bearings, they should not be construed restrictively. It is also possible to adopt a so-called four-arc bearing, five-arc bearing, or a multi-arc bearing formed by six or more arcuate surfaces. Further, apart from the construction in which two radial bearing portions are axially spaced apart from each other as in the case of the radial bearings R1 and R2, it is also possible to adopt a construction in which there is provided a single radial bearing portion extending over the vertical region of the inner peripheral surface of the bearing sleeve 8.

Further, while in the above-described embodiments multi-arc bearings are adopted as the radial bearing portions, it is also possible to form the radial bearing portions by other types of bearings. For example, although not shown, it is also possible to use a step bearing in which dynamic pressure grooves in the form of a plurality of axial grooves are formed in the regions of the inner peripheral surface 8a of the bearing sleeve 8 constituting the radial bearing surface.

In the following, an embodiment of the present invention will be described with reference to the drawings.

Figure 9:
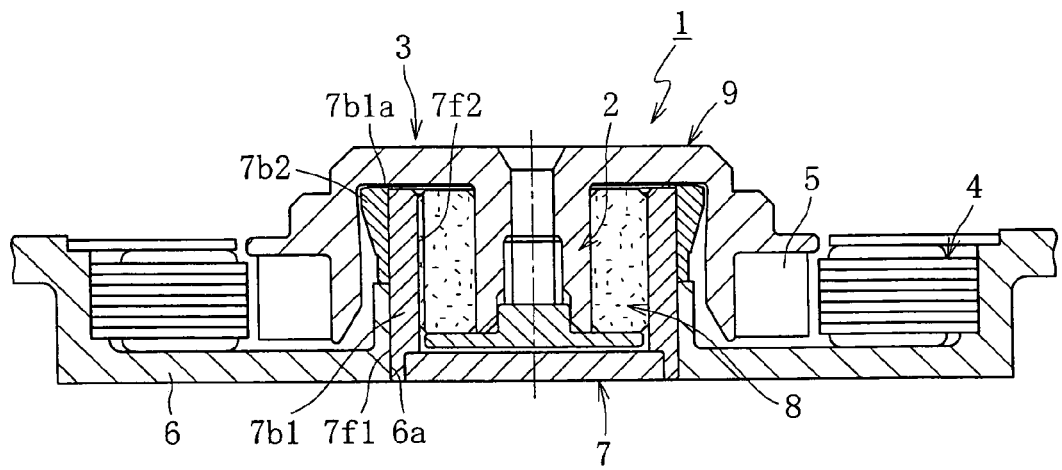
FIG. 9 is a sectional view of an information apparatus spindle motor with the fluid dynamic bearing device according to the present invention incorporated therein.

FIG. 9 is a conceptual drawing showing a construction example of a spindle motor for an information apparatus in which the fluid dynamic bearing device 1 according to an embodiment of the present invention is incorporated. This spindle motor for an information apparatus is used in a disk drive device, such as an HDD, and is equipped with the fluid dynamic bearing device 1 rotatably supporting in a non-contact fashion a rotating member 3 equipped with a shaft portion 2, the stator coil 4 and a rotor magnet 5 opposed to each other through the intermediation, for example, of a radial gap, and a motor bracket 6 formed of metal. The stator coil 4 is mounted to the inner periphery of the motor bracket 6, and the rotor magnet 5 is mounted to the outer periphery of the rotating member 3. The housing 7 of the fluid dynamic bearing device 1 is fixed to the inner periphery of the motor bracket 6 by adhesion or the like. The rotating member 3 retains one or a plurality of disk-like information recording mediums, such as magnetic disks. When the stator coil 4 is energized, the rotor magnet 5 is rotated by an electromagnetic force generated between the stator coil 4 and the rotor magnet 5, whereby the rotating member 3 and the shaft portion 2 are rotated integrally.

Figure 10:
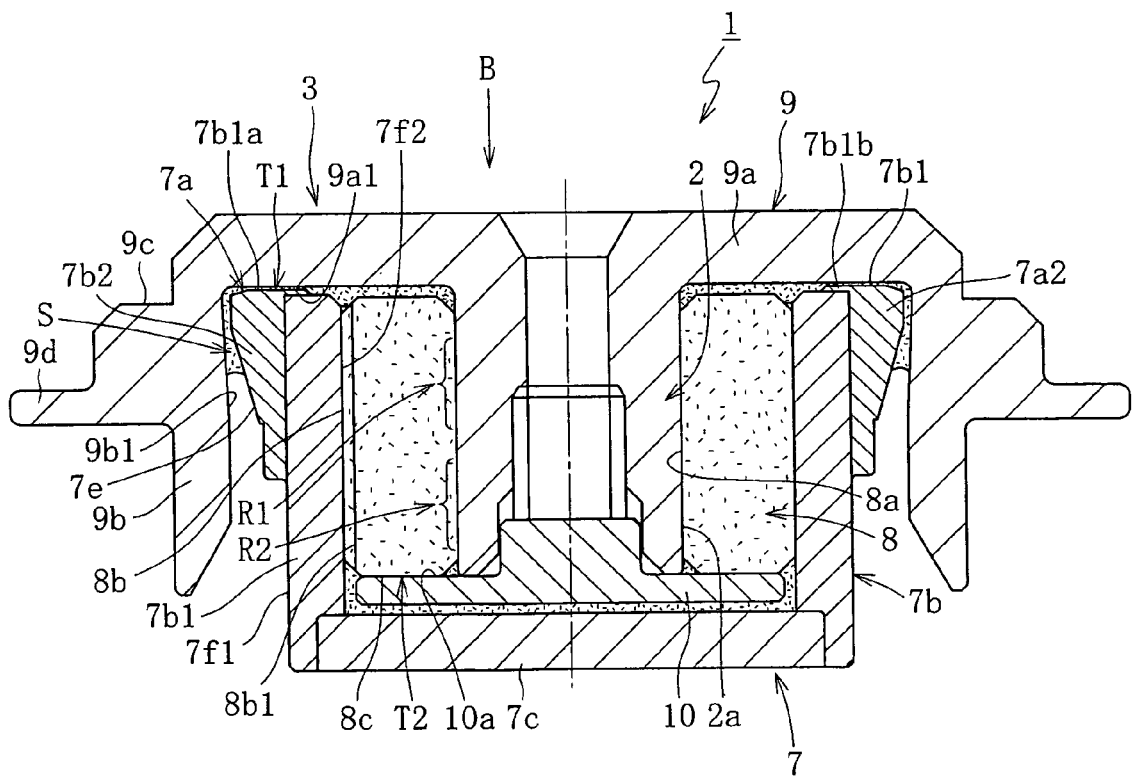
FIG. 10 is a sectional view of the fluid dynamic bearing device.

As shown, for example, in FIG. 10, the fluid dynamic bearing device 1 is equipped with the housing 7 having the opening 7a at one end and the bottom portion 7c at the other end, the bearing sleeve 8 fixed in position within the housing 7, and the rotating member 3 adapted to make a relative rotation with respect to the housing 7 and the bearing sleeve 8. In the following description, for the sake of convenience, the opening 7a side of the housing 7 will be referred to as upper side, and the bottom 7c side of the housing 7 will be referred to as lower side.

The rotating member 3 is composed, for example, of a hub portion 9 covering the opening side 7a of the housing 7, and the shaft portion 2 to be inserted into the inner periphery of the bearing sleeve 8.

The hub portion 9 is equipped with a disc-like base portion 9a covering the opening 7a side of the housing 7, a cylindrical portion 9b extending axially downwards from the outer peripheral portion of the base portion 9a, and a disk mounting surface 9c and a flange portion 9d that are provided in the outer periphery of the cylindrical portion 9b. A disc-like information recording medium (not shown) is fitted onto the outer periphery of the base portion 9a, and is placed on the disk mounting surface 9c. The disc-like information recording medium is retained on the hub portion 9 by an appropriate retaining means (not shown).

In this embodiment, the shaft portion 2 is formed integrally with the hub portion 9, and has at its lower end a separate flange portion 10. The flange portion 10 is fixed to the shaft portion 2 by a screw or the like.

The bearing sleeve 8 is formed as a cylinder of a porous material formed, for example, of a sintered metal, in particular, a porous material formed of a sintered metal whose main component is copper.

As shown in FIG. 10, on the inner peripheral surface 8a of the bearing sleeve 8, there are provided axially separated upper and lower two regions constituting the respective radial bearing surfaces of the first radial bearing portion R1 and the second radial bearing portion R2. In those two regions, there are respectively formed dynamic pressure grooves 8a1 and 8a2 of a herringbone configuration as shown, for example, in FIG. 11A. The upper dynamic pressure grooves 8a1 are formed axially asymmetrically with respect to the axial center m (axial center of the region between the upper and lower inclined grooves), and the axial dimension X1 of the region on the upper side of the axial center m is larger than the axial dimension X2 of the region on the lower side of the axial center m. Further, in the outer peripheral surface 8d of the bearing sleeve 8, there is formed one or a plurality of axial grooves 8d1 extending over the entire axial length of the bearing sleeve. In this embodiment, three axial grooves 8d1 are formed at equal circumferential intervals.

Figure 11A:
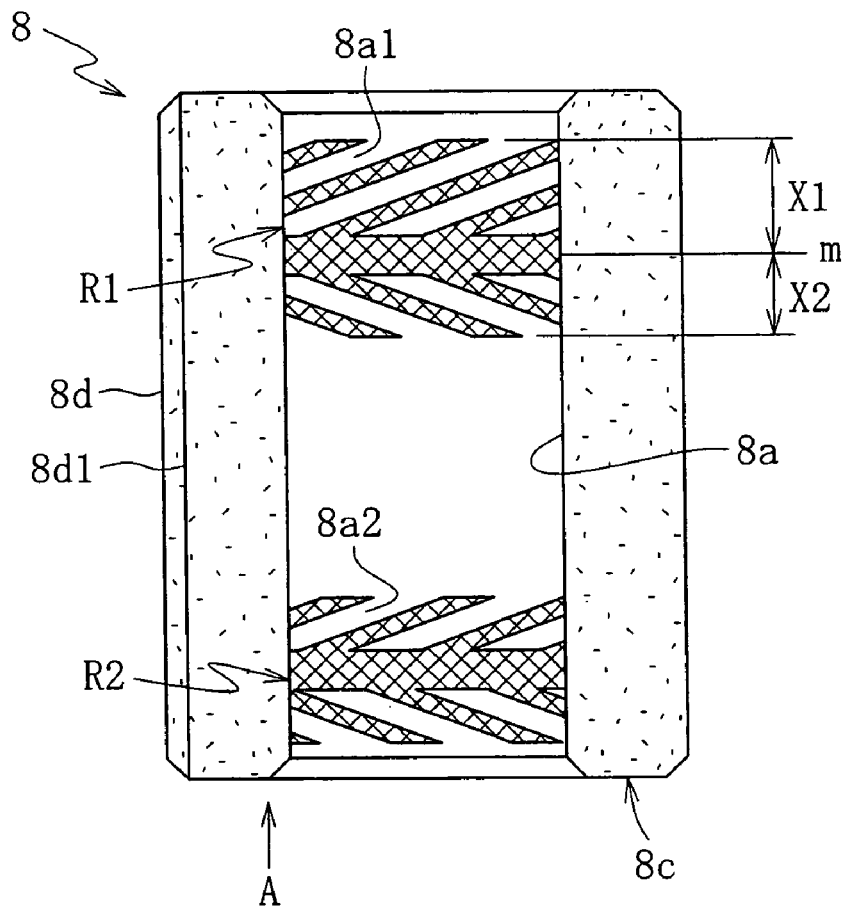
FIG. 11A is a sectional view of a bearing sleeve.
Figure 11B:
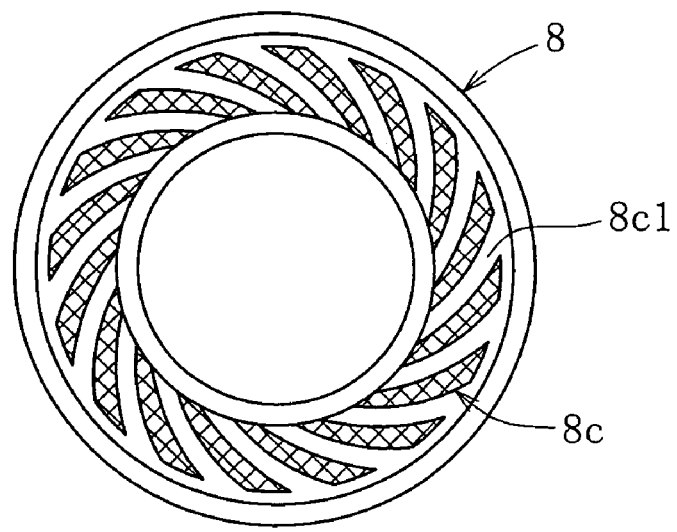
FIG. 11B is a bottom view of the bearing sleeve (as seen in the direction of the arrow A of FIG. 11A)

In the region of the lower end surface 8c of the bearing sleeve 8 constituting the thrust bearing surface of the thrust bearing portion T2, there are formed dynamic pressure grooves 8c1 as shown, for example, in FIG. 11B.

The housing 7 is equipped with the side portion 7b, the opening 7a situated at one end of the side portion 7b, and the bottom portion 7c situated at the other end of the side portion 7b. The side portion 7b is composed of a cylindrical metal portion 7b1 and a resin portion 7b2 provided in the outer periphery of the upper portion of the metal portion 7b1. The lower portion of the outer periphery of the metal portion 7b1 constitutes a fixation surface 7f1 that is fixed to an inner peripheral surface 6a of the motor bracket 6 shown in FIG. 1 by adhesion or the like. In this embodiment, the inner peripheral surface of the metal portion 7b1 constitutes a fixation surface 7f2 to which the metal bearing sleeve 8 is fixed by adhesion or the like.

Figure 12:
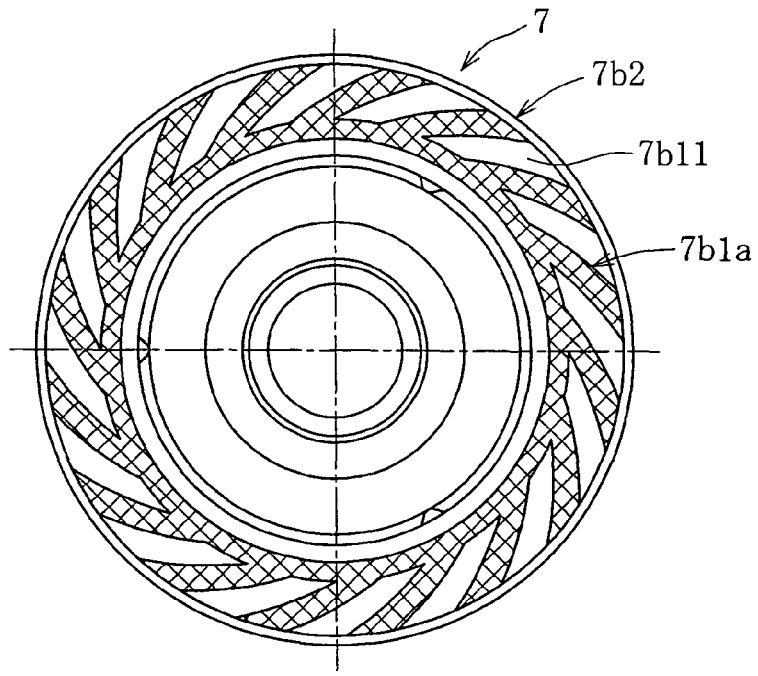
FIG. 12 is a plan view of a housing as seen in the direction of the arrow B of FIG. 10.

The upper end of the resin portion 7b2 extends inwardly beyond the outer peripheral surface of the housing side portion 7b, and the outer portion of the upper end surface of the housing side portion 7b is covered with an extending portion 7b1b. The opening 7a of the housing 7 is formed by the upper end of the resin portion 7b2 and the upper end of the metal portion 7b1. Dynamic pressure grooves 7b11 as shown, for example, in FIG. 12 are formed in the region of an upper end surface 7b1a of the resin portion 7b2 constituting the thrust bearing surface of the thrust bearing portion T1. Here, the inwardly expanding portion 7b1b of the resin portion 7b2 may also constitute the region where the dynamic pressure grooves 7b11 are formed.

The metal portion 7b1 is formed of a soft metal material, such as brass, or some other metal material, and the resin portion 7b2 is formed of a resin materials, such as liquid crystal polymer (LCP) or PPS. In this embodiment, the metal portion 7b1 and the resin portion 7b2 are integrally formed through injection molding of resin material, using the metal portion 7b1 as an insert part. In forming the dynamic pressure grooves 7b11 of the resin portion 7b2, the matrixes of the dynamic pressure grooves 7b11 are formed beforehand in the surface of the matrixes for molding the resin portion 7b2, and the configuration of the matrixes is transferred to the upper end surface 7b1a of the resin portion 7b2 when molding the resin portion 7b2, whereby the dynamic pressure grooves are formed simultaneously with the resin portion 7b2.

The bottom portion 7c separately formed from the side portion 7b is retrofitted to the lower portion of the side portion 7b. The bottom portion 7c is formed of a metal material or a resin material. In the former case, the bottom portion 7c is fixed to the side portion 7b by adhesion or the like; in the latter case, the bottom portion 7c is fixed to the side portion 7b by ultrasonic fusion-bonding or the like.

In the outer periphery of the resin portion 7b2, there is formed a tapered outer wall 7e whose diameter gradually increases upwardly. Between the tapered outer wall 7e and an inner peripheral surface 9b1 of the cylindrical portion 9b, there is formed an annular seal space S whose radial dimension gradually diminishes upwardly from the bottom portion 7c side of the housing 7. During rotation of the shaft portion 2 and the hub portion 9, the seal space S communicates with the outer portion of the thrust bearing gap of the thrust bearing portion T1.

The interior of the fluid dynamic bearing device 1, inclusive of the inner voids of the bearing sleeve 8 (voids of the porous texture), is filled with a lubricant. The oil level of the lubricant is always maintained within the seal space S.

When the rotating member 3 (shaft portion 2) of the fluid dynamic bearing device 1 rotates, the upper and lower two regions of the inner peripheral surface 8a of the bearing sleeve 8 constituting the radial bearing surfaces are opposed to the outer peripheral surface 2a of the shaft portion 2 through the intermediation of the radial bearing gap. As the shaft portion 2 rotates, the lubricant filling the radial bearing gap generates a dynamic pressure action, by the pressure of which the shaft portion 2 is supported radially and rotatably in a non-contact fashion. As a result, there are formed the first radial bearing portion R1 and the second radial bearing portion R2 supporting the rotating member radially and rotatably in a non-contact fashion. Further, a thrust bearing gap is formed between the upper end surface 7b1a of the resin portion 7b2 of the housing 7 and the lower end surface 9a1 of the hub portion 9 integrally formed with the shaft portion 2; as the rotating member 3 rotates, the lubricant filling the thrust bearing gap generates a dynamic pressure action, by the pressure of which the rotating member 3 is rotatably supported in the thrust direction in a non-contact fashion. As a result, there is formed the thrust bearing portion T1 rotatably supporting the rotating member 3 in the thrust direction in a non-contact fashion. In the same way, a thrust bearing gap is formed between the lower end surface 8c of the bearing sleeve 8 and the upper end surface 10a of the flange portion 10 of the shaft portion 2, and a dynamic pressure action of the lubricant is generated in the thrust bearing gap, whereby there is formed the second thrust bearing portion T2 supporting the rotating member 3 in the thrust direction in a non-contact fashion.

In this way, in this embodiment, the portion of the housing 7 including the fixation surfaces 7f1 and 7f2 to which metal members, such as the motor bracket 6 and the bearing sleeve 8 are fixed, is formed by the metal portion 7b1, and the portion including the thrust bearing surface where the dynamic pressure grooves 7b11 are formed, is formed by the resin portion 7b2. With this construction, it is possible to enhance the fixation strength between the housing 7 and the bearing sleeve 8, the motor bracket 6, etc., which are formed of metal, thereby making it possible to endow the fluid dynamic bearing device 1 with high shock resistance property as required, for example, of a portable information apparatus. Of course, when fixing them to each other by adhesion, it is possible to attain high adhesion strength, and the post-processing, such as the surface treatment of the fixation surfaces 7f1 and 7f2 for securing the adhesion force, and the electrolytic processing on the dynamic pressure grooves 7b11, thereby substantially reducing the production cost of the housing 7.

The present invention is not restricted to the first embodiment described above.

While in the first embodiment described above the thrust bearing surface having the dynamic pressure grooves 7b11 is provided on the upper end surface 7b1a of the resin portion 7b2 forming the opening 7a of the housing 7 (thrust bearing portion T1), and the thrust bearing surface having the dynamic pressure grooves 8c1 is provided on the lower end surface 8c of the bearing sleeve 8 (thrust bearing portion T2), the present invention is also applicable to a fluid dynamic bearing device solely equipped with the thrust bearing portion T1. In this case, as shown in FIG. 2, the shaft portion 2 has a straight configuration with no flange portion 10. Thus, the housing 7 can be formed as a bottomed cylinder in which the bottom portion 7c and the side portion 7b are integrated with each other.

Further, while in the above embodiment the bearing sleeve 8 is fixed to the fixation surface 7f2 of the side portion 7b of the housing 7 by adhesion, it is not particularly necessary to form the portion including the fixation surface 7f2 of the housing 7 of a metal material when a sufficient fixation force can be obtained between the bearing sleeve 8 and the housing 7 through fixation by a fixing method other than adhesion, such as press-fitting or ultrasonic fusion-bonding.

Figure 13:
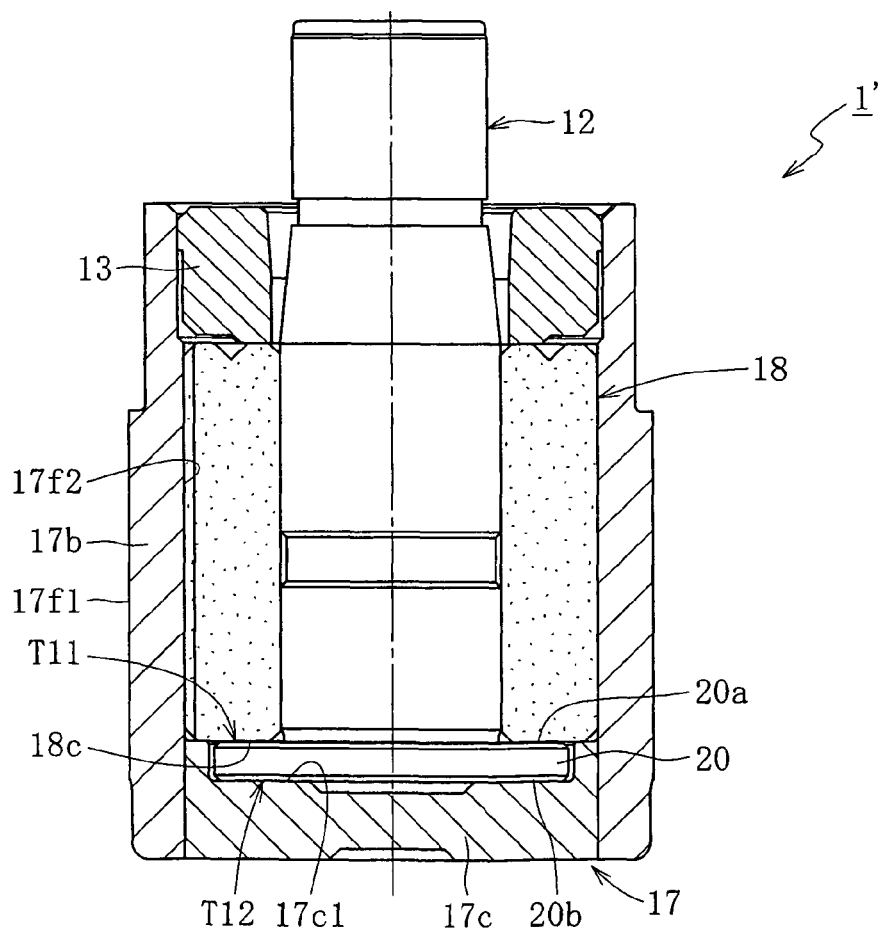
FIG. 13 is a sectional view of a fluid dynamic bearing device according to another embodiment of the present invention.

FIG. 13 shows a fluid dynamic bearing device 1' according to another embodiment. In this embodiment, a shaft portion 12 has at its lower end a flange portion 20 provided integrally or separately. A housing 17 is equipped with a cylindrical side portion 17b and a bottom member 17c fixed to the lower end portion of the side portion 17b. A seal member 13 is fixed to the inner periphery of the upper end portion of the side portion 17b of the housing 17. Although not shown, dynamic pressure grooves of, for example, a spiral configuration, are formed in an inner bottom surface 17c1 of the bottom member 17c of the housing 17, and dynamic pressure grooves of a similar configuration are also formed in a lower end surface 18c of a bearing sleeve 18. A thrust bearing portion T11 is formed between the lower end surface 18c of the bearing sleeve 18 and an upper end surface 20a of the flange portion 20 of the shaft portion 12, and a thrust bearing portion T12 is formed between the inner bottom surface 17c1 of the bottom member 17c of the housing 17 and a lower end surface 20b of the flange portion 20.

In this embodiment, the side portion 17b of the housing 17 is formed in a cylindrical configuration of a metal material, and has a fixation surface 17f1 and a fixation surface 17f2 in the outer periphery and the inner periphery, respectively, of the side portion 17b. Although not shown, a metal motor bracket is fixed to the fixation surface 17f1 by adhesion, press-fitting or the like, and the metal bearing sleeve 18 is fixed to the fixation surface 17f2 by adhesion or the like. The bottom member 17c having the dynamic pressure grooves is molded of a resin material, and is fixed to the lower end portion of the side portion 17b by ultrasonic fusion-bonding or the like. The seal member 13 is formed of a metal material or a resin material. In the former case, the seal member 13 is fixed to the side portion 17b by adhesion or the like; in the latter case, the seal member 13 is fixed to the side portion 17b by ultrasonic fusion-bonding. Otherwise, this embodiment is substantially the same as the first embodiment, and a redundant description thereof will be omitted.

In all of the embodiments shown in FIGS. 10 and 13, the radial bearing portions R1 and R2 may be formed by multi-arc bearings as shown in FIGS. 8A through 8C or by step bearings.

What is claimed is:

1. A fluid dynamic bearing device, comprising:
   a rotating member;
   a stationary member arranged relative to the rotating member so as to form a radial bearing gap and a thrust bearing gap therebetween;
   a radial bearing portion configured to retain the rotating member and the stationary member in a radial direction in non-contact fashion by dynamic pressure action of a fluid generated in the radial bearing gap between the rotating member and the stationary member; and
   a thrust bearing portion configured to retain the rotating member and the stationary member in a thrust direction in non-contact fashion by dynamic pressure action of the fluid generated in the thrust bearing gap between the rotating member and the stationary member,
   wherein at least a portion of the stationary member and at least a portion of the rotating member face the thrust bearing gap and are formed of resin, and
   wherein at least one of the at least a portion of the stationary member formed of resin and the at least a portion of the rotating member is formed of resin is blended with reinforcement fibers of a fiber diameter of 1 to 12 μm as a filler.

2. A fluid dynamic bearing device according to claim 1, wherein the reinforcement fibers are blended in the resin in an amount of 5 to 20 vol %.

3. A fluid dynamic bearing device according to claim 2, wherein the filler is blended in the resin in a total amount of 30 vol % or less.

4. A fluid dynamic bearing device according to claim 1, wherein the filler further contains an electrically conductive agent.

5. A fluid dynamic bearing device according to claim 4, wherein the filler is blended in the resin in a total amount of 30 vol % or less.

6. A fluid dynamic bearing device according to claim 1, wherein the filler is blended in the resin in a total amount of 30 vol % or less.

7. A fluid dynamic bearing device according to claim 1, wherein the reinforcement fibers are PAN-based carbon fibers.

8. A fluid dynamic bearing device according to claim 1, wherein the at least a portion of the stationary member formed of resin and the at least a portion of the rotating member formed of resin facing the thrust bearing gap are formed of resin materials of different base resins.

9. A fluid dynamic bearing device according to claim 1, wherein one of the at least a portion of the stationary member formed of resin and the at least a portion of the rotating member formed of resin facing the thrust bearing gap is formed of LCP.

10. A fluid dynamic bearing device according to claim 1, wherein one of the at least a portion of the stationary member formed of resin and the at least a portion of the rotating member formed of resin facing the thrust bearing gap is formed of PPS.

11. A fluid dynamic bearing device according to claim 1, wherein the at least a portion of the rotating member formed of resin is a flange portion of a shaft member.

12. A fluid dynamic bearing device according to claim 1, wherein the at least a portion of the rotating member formed of resin is a rotating member having a mounting portion for a rotor magnet.

13. A fluid dynamic bearing device according to claim 1, wherein:
the rotating member is a shaft member, and the stationary member is a bearing sleeve and a housing; and wherein
the bearing sleeve has an inner periphery, the inner periphery being configured so as to have the shaft member inserted therein,
the bearing sleeve is fixed in position inside the housing, and the housing has a portion facing the thrust bearing gap.

14. A motor comprising:
a fluid dynamic bearing device according to claim 1;
a rotor magnet; and
a stator coil.

15. The fluid dynamic bearing device according to claim 1, wherein both of the at least a portion of the stationary member and the at least a portion of the rotating member are blended with reinforcement fibers of a fiber diameter 1 to 12 μm as a filler.

16. A fluid dynamic bearing device comprising:
a housing;
a bearing sleeve fixed in position inside the housing;
a rotating member configured to rotate relative to the bearing sleeve and the housing, the rotating member being arranged relative to the bearing sleeve so as to form a radial bearing gap therebetween and being arranged relative to the housing so as to form a thrust bearing gap therebetween;
a radial bearing portion configured to support the rotating member in a radial direction in non-contact fashion by dynamic pressure action of a lubricant generated in the radial bearing gap between the rotating member and the bearing sleeve; and
a thrust bearing portion configured to support the rotating member in a thrust direction in non-contact fashion by dynamic pressure action of the lubricant generated in the thrust bearing gap between the rotating member and the housing,
wherein the housing constitutes the thrust bearing portion and has a thrust bearing surface in which dynamic pressure grooves are formed and a fixation surface to which a metal member is fixed, and
wherein the housing has a portion including the thrust bearing surface and being formed of a resin material, and a portion including the fixation surface formed of a metal material.

17. A fluid dynamic bearing device according to claim 16, wherein the housing is formed through injection molding of a resin material, using the portion including the fixation surface formed of the metal material as an insert part.

18. A fluid dynamic bearing device according to claim 16, wherein the housing has a cylindrical side portion, the cylindrical side portion having a first end and a second end, and an opening is disposed at the first end of the side portion, and a bottom portion is disposed at the second end of the side portion, with the thrust bearing surface being disposed on a side of the opening.

19. A fluid dynamic bearing device according to claim 16, wherein the housing has a cylindrical side portion, the cylindrical side portion having a first end and a second end, and an opening is disposed at the first end of the side portion, and a bottom portion is disposed at the second end of the side portion, with the thrust bearing surface being disposed on a side of the bottom portion.

20. The fluid dynamic bearing device according to claim 16, wherein the housing includes a resin portion having the thrust bearing surface and a cylindrical metal portion having the stationary surface, the metal portion has a first closed end part and a second opened end part, and a resin portion is disposed at the second end part.

21. A motor comprising:
a fluid dynamic bearing device according to claim 16;
a rotor magnet; and
a stator coil.

* * * * *